(12) United States Patent
Tian et al.

(10) Patent No.: US 11,115,785 B2
(45) Date of Patent: Sep. 7, 2021

(54) MANAGING COMMUNICATION GROUPS BASED ON OBJECTS IN IMAGE FEEDS

(71) Applicant: MOTOROLA SOLUTIONS, INC., Chicago, IL (US)

(72) Inventors: Yong Tian, Sichuan (CN); Dajun Chen, Sichuan (CN); Xun Fei, Sichuan (CN); Dong Zhao, Sichuan (CN); Kangkai Zhao, Sichuan (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 83 days.

(21) Appl. No.: 16/061,874

(22) PCT Filed: Jan. 14, 2016

(86) PCT No.: PCT/CN2016/070905
§ 371 (c)(1),
(2) Date: Jun. 13, 2018

(87) PCT Pub. No.: WO2017/120816
PCT Pub. Date: Jul. 20, 2017

(65) Prior Publication Data
US 2018/0376294 A1    Dec. 27, 2018

(51) Int. Cl.
*H04W 4/08* (2009.01)
*G07G 1/14* (2006.01)
*G06K 9/00* (2006.01)

(52) U.S. Cl.
CPC .......... *H04W 4/08* (2013.01); *G06K 9/00671* (2013.01); *G06K 9/00771* (2013.01); *G07G 1/14* (2013.01)

(58) Field of Classification Search
CPC . H04W 4/08; H04W 4/10; G07G 1/14; G06K 9/00771; G06K 9/00671; G06K 9/00624
See application file for complete search history.

(56) References Cited

U.S. PATENT DOCUMENTS 8,825,096 B2    9/2014 Bekiares et al.
8,862,173 B2    10/2014 Marocchi et al.
(Continued)

FOREIGN PATENT DOCUMENTS

CN      1639711      7/2005
CN      101512587    8/2009
(Continued)

OTHER PUBLICATIONS

PCT/CN2016/070905 International Search Report and Written Opinion of the International Searching Authority dated Oct. 11, 2016 (12 pages).

*Primary Examiner* — Nam T Tran
*Assistant Examiner* — Lam H Duong
(74) *Attorney, Agent, or Firm* — Michael Best & Friedrich LLP

(57) ABSTRACT

Methods, and apparatus for managing a communication group. One method includes forming a communication group of one or more portable communications devices based on a first object of interest and identifying a second object of interest based on the first object of interest. The method also includes determining whether an image feed includes the second object of interest and when the image feed includes the second object of interest, adding a portable communications device associated with the image feed to the communication group.

20 Claims, 6 Drawing Sheets

(56) References Cited

U.S. PATENT DOCUMENTS

| | | |
|---|---|---|
| 9,020,832 B2 | 4/2015 | Fisher et al. |
| 9,591,133 B2 | 3/2017 | Agulnik et al. |
| 9,948,902 B1* | 4/2018 | Trundle ................ H04N 7/183 |
| 2007/0202908 A1* | 8/2007 | Shaffer ................ H04W 4/021 |
| | | 455/518 |
| 2008/0055395 A1* | 3/2008 | Mock ............... H04N 21/41407 |
| | | 348/14.01 |
| 2008/0108339 A1* | 5/2008 | Shaffer ............ G08B 13/19608 |
| | | 455/416 |
| 2011/0161399 A1* | 6/2011 | Agulnik .............. H04L 65/4038 |
| | | 709/203 |
| 2012/0084669 A1 | 4/2012 | Flint et al. |
| 2013/0259387 A1* | 10/2013 | Gunn ................... G06K 9/6202 |
| | | 382/218 |
| 2014/0099004 A1* | 4/2014 | DiBona ................... H04N 7/15 |
| | | 382/118 |
| 2015/0092979 A1* | 4/2015 | Meredith ........... G06K 9/00664 |
| | | 382/103 |
| 2015/0135329 A1 | 5/2015 | Aghasaryan et al. |
| 2017/0076168 A1* | 3/2017 | Vrabete ............. G06K 9/00624 |
| 2017/0099455 A1* | 4/2017 | Mazzarella ............. H04W 4/90 |
| 2017/0193325 A1* | 7/2017 | Duong ............... G06K 9/00268 |

FOREIGN PATENT DOCUMENTS

| | | |
|---|---|---|
| CN | 103502986 | 1/2014 |
| WO | 2008027682 | 11/2008 |

\* cited by examiner

MANAGING COMMUNICATION GROUPS BASED ON OBJECTS IN IMAGE FEEDS

BACKGROUND OF THE INVENTION

Wireless communication networks support communications between portable communications devices. In some wireless communication networks, for example, land mobile radio (LMR) and trunked radio networks, the portable communications devices communicate with each other in a communication group, sometimes referred to as a talkgroup. A talkgroup is a group of portable communications devices (e.g., created by an administrator) in which each portable communications device in the talkgroup may participate in a group call. Group calls may be initiated and managed, for example, at a call controller.

A public safety organization may establish a talkgroup for a mission or incident (e.g., a fire, a traffic accident, and the like) and members of the public safety organization or other organizations may be assigned to the talkgroup. As the incident or mission changes or as individual assignments change, the members of the talkgroup may need to be updated.

Accordingly, there is a need for methods and systems for managing a communication group.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
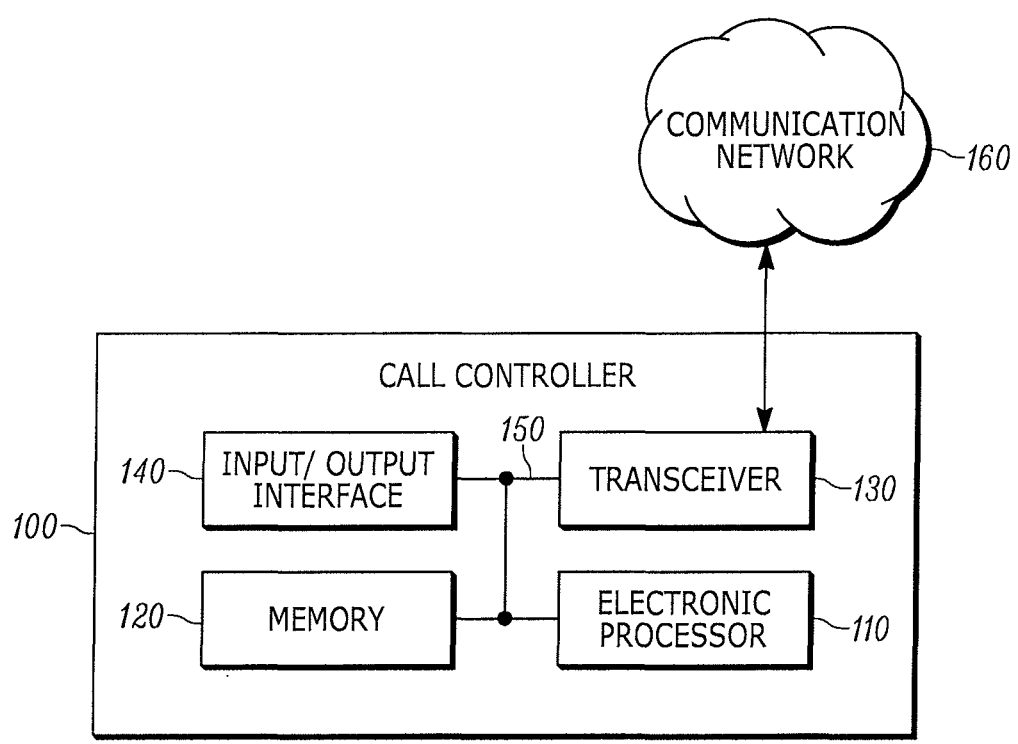
FIG. 1 is a block diagram of call controller in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method of managing a communication group. The method includes forming a communication group of one or more portable communications devices based on a first object of interest. The method also includes identifying a second object of interest based on the first object of interest. The method further includes determining whether an image feed includes the second object of interest. When the image feed includes the second object of interest, an electronic processor adds a portable communications device associated with the image feed to the communications group of one or more portable communications devices.

Another embodiment provides a call controller including a transceiver, an electronic processor coupled to the transceiver, and a memory coupled to the electronic processor. The transceiver receives an image feed associated with a subscriber unit. The memory includes instructions that, when executed by the electronic processor, perform a set of functions. The set of functions includes forming a communication group of one or more portable communications devices based on a first object of interest. The set of functions also includes identifying a second object of interest based on the first object of interest. The set of functions further includes determining whether the image feed includes the second object of interest and, when the image feed includes the second object of interest, adding a portable communications device associated with the image feed to the communication group.

Another embodiment provides a method of managing a communication group. The method includes forming a communication group of one or more portable communications devices. The method also includes creating a list of objects of interest including a first object of interest and at least a second object of interest that is identified based on the first object of interest. The method further includes removing, by a processor, at least one of the one or more portable communications device from the communication group when an image feed associated with the at least one of the one or more portable communications device does not include at least one object included in the list of objects of interest.

FIG. 1 is a block diagram of one embodiment of a call controller 100. In some embodiments, the call controller 100 may be a dispatch controller used by a public safety organization, such as a fire department or a police department. As illustrated in FIG. 1, the call controller 100 includes an electronic processor 110, a memory 120, a transceiver 130, and an optional input/output (I/O) interface 140. The electronic processor 110, the memory 120, the transceiver 130, and the input/output interface 140 communicate over one or more control and/or data buses (e.g., a communication bus 150). It should be understood that FIG. 1 illustrates only one exemplary embodiment of a call controller 100 and that the call controller 100 may include more or less components and may perform additional functionality than described herein.

In some embodiments, the electronic processor 110 is implemented partially or entirely as a semiconductor chip, a field-programmable gate array (FPGA), an application specific integrated circuit (ASIC), and the like. The memory 120 includes non-transitory memory that stores instructions that are received and executed by the electronic processor 110 to carry out functionality of the call controller 100 described herein. The memory 120 may include, for example, a program storage area and a data storage area. The program storage area and the data storage area may include combinations of different types of memory, such as a hard disk, a CD-ROM (Compact Disc Read Only Memory), an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) or a flash memory.

The transceiver 130 sends and receives data over a communication network 160. For example, as described in more detail below, the transceiver 130 may receive an image feed over the communication network 160 and may also send data over the communication network 160, such as talkgroup assignments. The communication network 160 may include a land mobile radio (LMR) network, a terrestrial trunked radio (TETRA) network, or a digital mobile radio (DMR) network. The communication network 160 may also include a wide area network (WAN) (e.g., a transport control protocol/internet protocol (TCP/IP) based network, a cellular network, such as, for example, a Global System for Mobile Communications (or Groupe Spécial Mobile (GSM)) network, a General Packet Radio Service (GPRS) network, a Code Division Multiple Access (CDMA) network, an Evolution-Data Optimized (EV-DO) network, an Enhanced Data Rates for GSM Evolution (EDGE) network, a 3GSM network, a 4GSM network, a Digital Enhanced Cordless Telecommunications (DECT) network, a Digital advanced mobile phone system (AMPS) (IS-136/ time division multiple access (TDMA)) network, or an Integrated Digital Enhanced Network (iDEN) network, and the like). In other embodiments, the communication network 160 may include a local area network (LAN), a neighborhood area network (NAN), a home area network (HAN), or a personal area network (PAN) employing any of a variety of communications protocols, such as Wi-Fi™, Bluetooth®, ZigBee®, and the like. It should also be understood that, in some embodiments, the call controller 100 communicates over additional communication networks or connections (e.g., wired or wireless).

As noted above, the call controller 100 may optionally include the input/output interface 140 that includes one or more input mechanisms, one or more output mechanisms, or a combination thereof. For example, the input/output interface 140 may include a display unit. The display unit may include, for example, a liquid crystal display (LCD), a light-emitting diode (LED) display, and organic light emitting diode (OLED) display, an electroluminescent display (ELD), a surface-conduction electron-emitter display (SED), a field emission display (FED), a thin-film transistor (TFT) liquid crystal display, a super active-matrix organic light emitting diode (AMOLED) display, and the like. In some embodiments, the display unit includes a touchscreen that acts as both an input mechanism and an output mechanism. In some embodiments, the input/output interface 140 also includes a keyboard, keypad, mouse, or other input mechanism that receives input from a user, such as a network administrator. Alternatively or in addition, a separate computer console (e.g., a laptop computer, a desktop computer, a portable communications device, a computer terminal, and the like) may act as a remote input/output interface for the call controller 100. For example, a user may use a computer console to provide input to (e.g., select image feeds, select configuration settings, modify communication groups, and the like) and receive output from (e.g., view image feeds, view communication group assignments, and the like) the call controller 100. The call controller 100 may communicate with the computer console over or a wired or wireless connection (e.g., the communication network 160).

Figure 2:
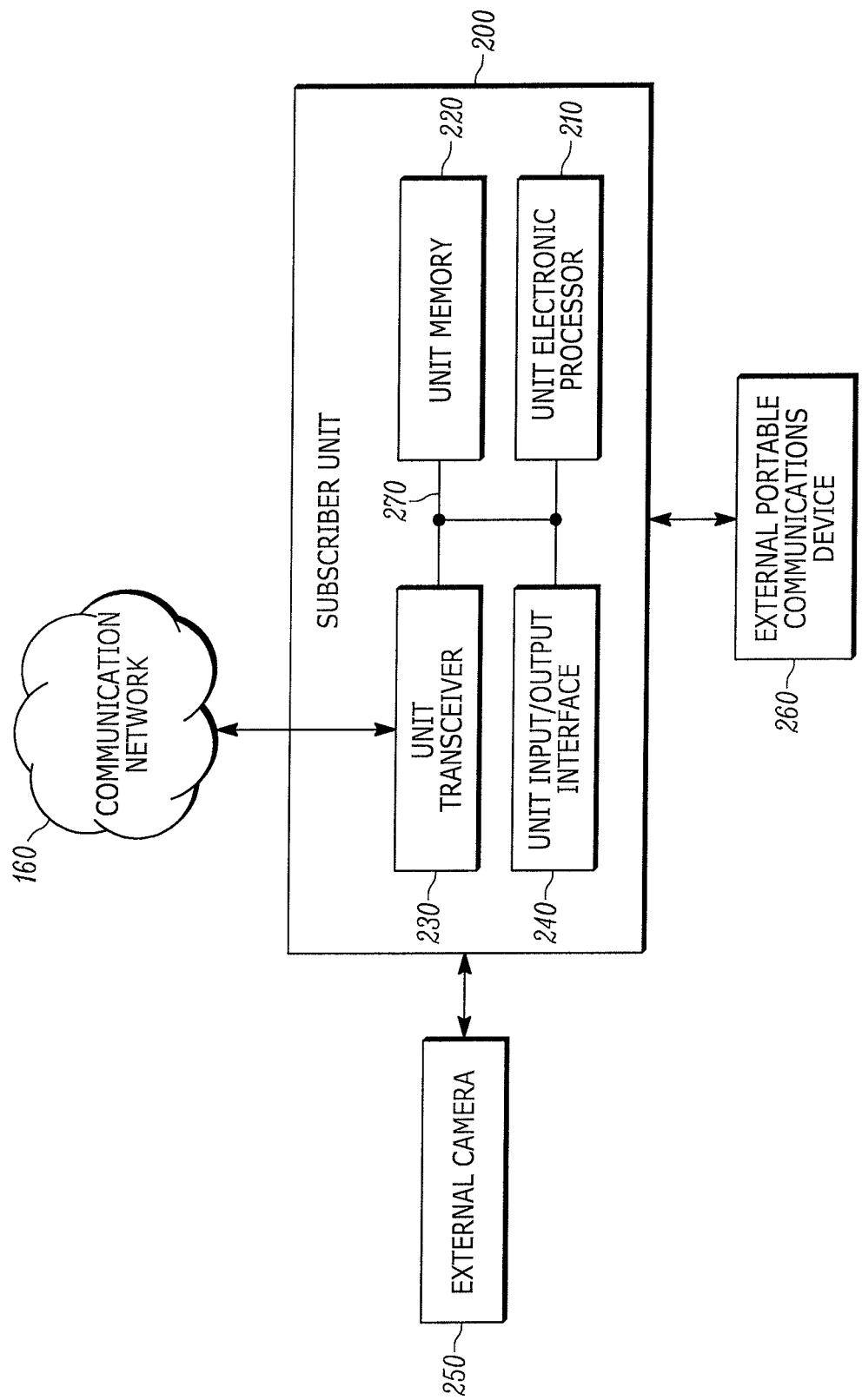
FIG. 2 is a block diagram of a subscriber unit in accordance with some embodiments.

FIG. 2 is a block diagram of one embodiment of a subscriber unit 200. In some embodiments, the subscriber unit 200 is a body camera, a dashboard camera, a drone camera, or another device that generates images and transmits generated images to the call controller 100. In other embodiments, the subscriber unit 200 is a portable communications device, such as a smart telephone, a mobile radio, a tablet computer, a smart watch, and the like that includes a camera that generates images. Accordingly, in this situation, the portable communications device transmits images generated by the camera to the call controller 100. As yet another alternative, in some embodiments, the subscriber unit 200 acts as an intermediary device between an external camera and a call controller 100. For example, the subscriber unit 200 may receive images generated by an external camera (e.g., a body camera, a dashboard camera, a drone camera, and the like over a wired or wireless connection) and may transmit the generated images to the call controller 100. Further still, in some embodiments, the subscriber unit 200 acts as an intermediary device between an external camera and a portable communications device. In particular, the subscriber unit 200 may receive images generated by an external camera (e.g., a body camera, a dashboard camera, a drone camera, and the like over a wired or wireless connection) and may transmit the generated images to a portable communications device for transmission to the call controller 100. In other words, the subscriber unit 200 receives images (e.g., generated by an internal camera or an external camera) and communicates the received images to the call controller 100 (e.g., directly or through a separate portable communications device). In some embodiments, the subscriber unit 200 also receives data from the call controller 100 (e.g., directly or through an external portable communications device). Also, it should be understood that functionality described herein as being performed by a subscriber unit 200 may similarly be performed by a portable communications device (e.g., including a camera or communicating with an external camera).

As illustrated in FIG. 2, the subscriber unit 200 includes a unit electronic processor 210, a unit memory 220, a unit transceiver 230, and an optional unit input/output interface 240. The unit electronic processor 210, the unit memory 220, and the unit transceiver 230 communicate over one or more control and/or data buses (e.g., a unit communication bus 270). It should also be understood that FIG. 2 illustrates only one exemplary embodiment of a subscriber unit 200 and that, in other embodiments, the subscriber unit 200 may include more or less components and may perform additional functionality than described herein.

In some embodiments, the unit electronic processor 210 is implemented partially or entirely as a semiconductor chip, a field-programmable gate array (FPGA), an application specific integrated circuit (ASIC), and the like. The unit memory 220 includes a non-transitory memory that stores instructions that are received and executed by the unit electronic processor 210 to carry out functionality of the subscriber unit 200. The unit memory 220 may include, for example, a program storage area and a data storage area. The program storage area and the data storage area may include combinations of different types of memory, such as a hard disk, a CD-ROM (Compact Disc Read-Only Memory), an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) or a flash memory.

The unit transceiver 230 receives and sends data over the communication network 160. For example, the unit transceiver 230 may send an image feed (e.g., a live image feed) to the call controller 100. In some embodiments, the unit transceiver 230 also receives data from the call controller 100 over the communication network 160. It should also be understood that the subscriber unit 200 may communicate over additional communication networks or connections (e.g., wired or wireless).

In some embodiments, the unit input/output interface 240 includes one or more input mechanisms, one or more output mechanisms, or a combination thereof that act as a user interface for the subscriber unit 200. For example, the unit input/output interface 240 may include a display unit (e.g., for displaying an image feed). The display unit may include, for example, a liquid crystal display (LCD), a light-emitting diode (LED) display, and organic light emitting diode (OLED) display, an electroluminescent display (ELD), a surface-conduction electron-emitter display (SED), a field emission display (FED), a thin-film transistor (TFT) liquid crystal display, a super active-matrix organic light emitting diode (AMOLED) display, and the like. In some embodiments, the display unit may include a touch screen that acts as both an input mechanism and an output mechanism. The unit input/output interface 240 may also include a keyboard, keypad, button, knob, or other mechanisms for receiving input from a user, such as for turning on or off the subscriber unit 200.

Alternatively or in addition, a separate device (e.g., a laptop computer, a desktop computer, a portable communications device, a computer terminal, and the like) may act as a remote input/output interface for the subscriber unit 200. For example, a user may use a portable communications device to provide input to (e.g., select image feeds, select configuration settings, and the like) and receive output from (e.g., view image feeds) the subscriber unit 200. The subscriber unit 200 may communicate with such a separate device over or a wired or wireless connection (e.g., the communication network 160).

As illustrated in FIG. 2 and as described above, in some embodiments, the subscriber unit 200 communicates with an external camera 250 over a wired or wireless connection (e.g., a universal serial bus (USB) cable, a wireless connection such as the communication network 160, and the like). It should be understood that the subscriber unit 200 may communicate with the external camera 250 through the unit input/output interface 240, the unit transceiver 230, or both. Again, as noted above, in some embodiments, the subscriber unit 200 may include an internal camera as an alternative to or in addition to communicating with the external camera 250. The internal camera may be similar to the external camera 250 described herein.

The external camera 250 may generate an image feed (e.g., a live image feed) of the environment around the external camera 250. The external camera 250 may be a still camera, video camera, or another sensor generating an image and may be included in a portable communications device, a body camera, a dashboard camera, a closed-circuit television (CCTV) camera, or another device including a camera.

As also illustrated in FIG. 2 and as also described above, in some embodiments, the subscriber unit 200 communicates with an external portable communications device 260. The external portable communications device 260 may include a mobile telephone (e.g., a cellular telephone), mobile radio, smart watch, tablet computer, and the like. The subscriber unit 200 may communicate with the external portable communications device 260 through the unit input/output interface 240, the unit transceiver 230, or both. It should also be understood that, in some embodiments, the subscriber unit 200 is contained within the external portable communications device 260 or the functionality of the subscriber unit 200 described herein is performed by the external portable communications device 260. Also, in some embodiments, the external camera 250 is included in the external portable communications device 260.

In some embodiments, the external portable communications device 260 initiates and receives communications (e.g., voice calls, text messages, electronic mail messages, pages, and the like). For example, the external portable communications device 260 may be a two-way radio, a land mobile radio (LMR), a portable telephone, a cellular telephone, a smart telephone, a smart watch, a tablet computer, or another two-way communication device. The external portable communications device 260 may also communicate with the call controller 100 (e.g., over the communication network 160 or a separate wired or wireless communication network). For example, as described in more detail below, the external portable communications device 260 may communicate with the call controller 100 to provide images generated by the external camera 250, receive a talkgroup identifier, or both.

Figure 3:
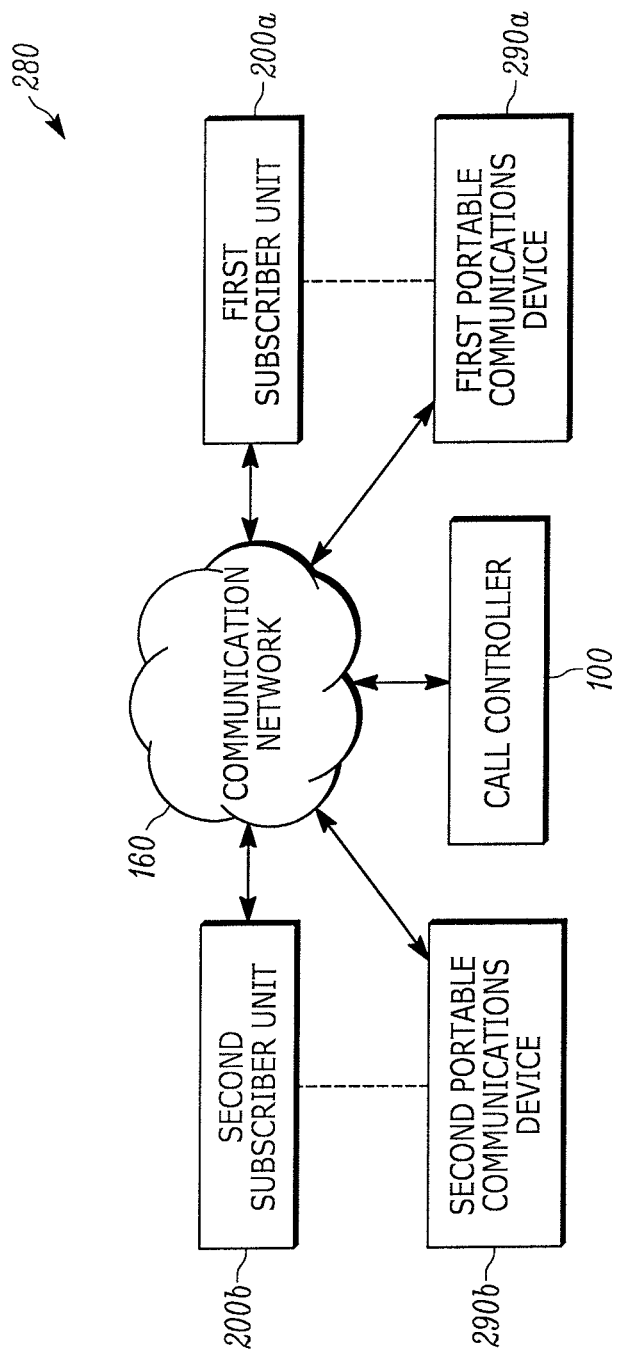
FIG. 3 is a block diagram illustrating a system for forming a communication group.

As noted above, the subscriber unit 200 communicates with the call controller 100. For example, FIG. 3 schematically illustrates a system 280 that includes the call controller 100 and a plurality of subscriber units 200 communicating with the call controller 100 over the communication network 160. As one example, the plurality of subscriber units 200 includes a first subscriber unit 200a and a second subscriber unit 200b. However, it should be understood that although the call controller 100 is illustrated as communicating with only two subscriber units 200, the call controller 100 may communicate with a plurality of subscriber units 200. Also, it should be understood that, in some embodiments, the call controller 100 communicates with subscriber units 200 over different communication networks or connections (e.g., wired or wireless).

As illustrated in FIG. 3, a subscriber unit 200 may be associated with a portable communications device. For example, the first subscriber unit 200a may be associated with a first portable communications device 290a, and the second subscriber unit 200b may be associated with a second portable communications device 290b. The first portable communications device 290a and the second portable communications device 290b may be similar to the external portable communications device 260 described above. In some embodiments, the call controller 100 also communicates with the first portable communications device 290a and the second portable communications device 290b (e.g., over the communication network 160 or a separate communication networks).

Also, as noted above, in some embodiments, a subscriber unit 200 may be included within a portable communications device or the functionality provided by a subscriber unit 200 may be provided by a portable communications device. For example, in some embodiments, the functionality performed by the first subscriber unit 200a may be performed by the first portable communications device 290a, and the functionality performed by the second subscriber unit 200b may be performed by the second portable communications device 290b. It should also be understood that, in some embodiments, a subscriber unit 200 is not associated with a portable communications device. For example, a stationary pan-tilt-zoom camera may not be associated with a portable communications device. Also, in some embodiments, a subscriber unit 200 may be associated with multiple portable communications devices. For example, a dashboard camera mounted in a police vehicle may be associated with the portable communications device carried by each police officer riding in the police vehicle. In yet other embodiments, multiple subscriber units 200 may be associated with one portable communications device 290a.

As noted above, the call controller 100 may function as a dispatch controller for a public safety organization (e.g., a police department, first responders, and the like). Accordingly, the call controller 100 may communicate with a portable communications device to assign the portable communication device to a particular communication group. As noted above, a communication group is a group of portable communications devices in which each portable communications device in the communication group (i.e., members) may participate in group communications (e.g., a group call).

The call controller 100 may initiate and manage a communication group. For example, the call controller 100 may group one or more portable communications devices into a communication based on a common mission (e.g., responding to the same incident). In the description provided herein, it should be understood that the term "based on" should be interpreted as an open-ended term and not viewed as implying that only one factor may form the foundation of an action or step. When a communication group is formed, the call controller 100 may provide information regarding a communication channel over which the communication group may communicate (e.g., over the communication network 160). For example, referring to the system 280, the call controller 100 may provide a talkgroup identifier associated with the communication group to the second portable communications device 290b to add the second portable communications device 290b to a particular communication group. Similarly, in some embodiments, the second portable communications device 290b may transmit a request to the call controller 100 to be included in a particular communication group, and, in response, the call controller 100 may provide the talkgroup identifier associated with the communication group to the second portable communications device 290b.

Figure 4:
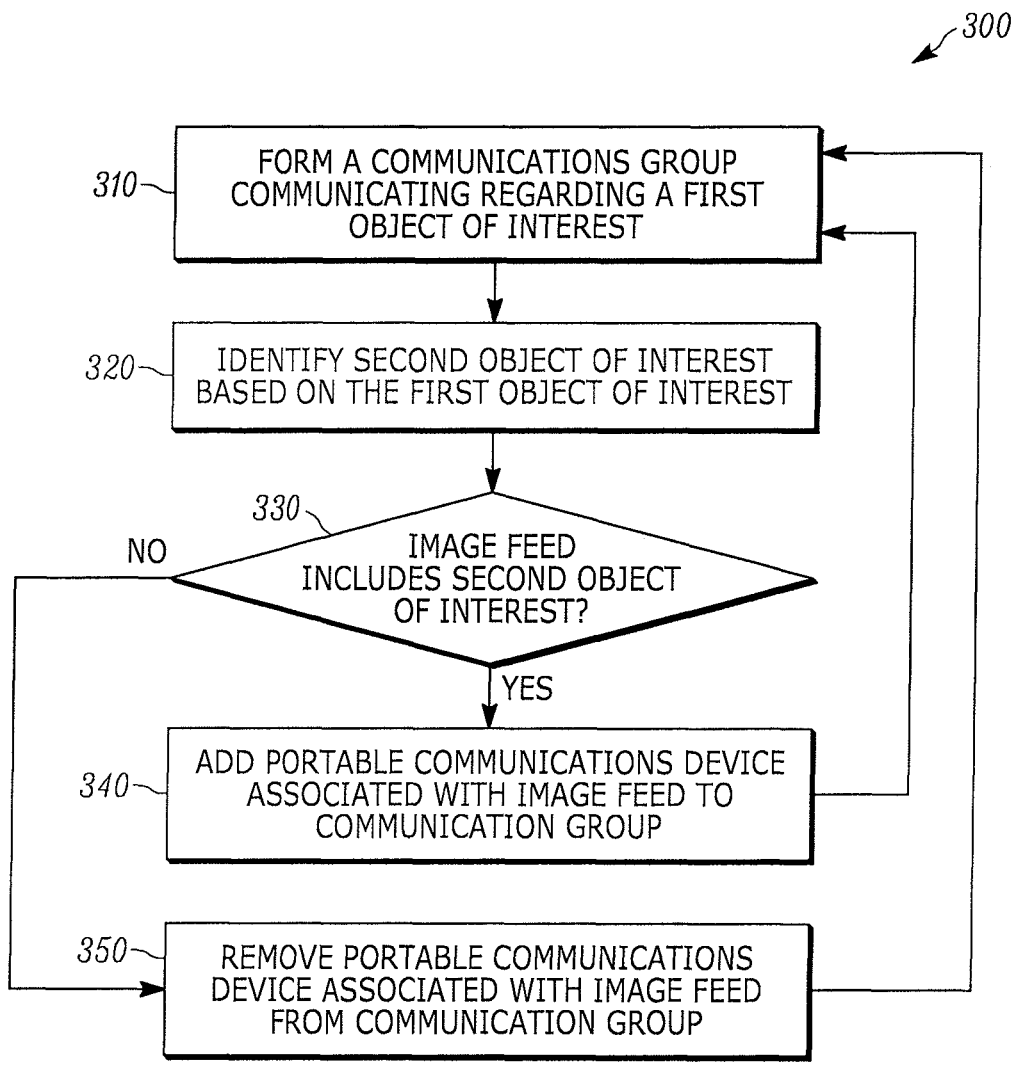
FIGS. 4, 5, and 6 are flowcharts of methods of forming a communication group performed by the system of FIG. 3 in accordance with some embodiments.

FIG. 4 is a flowchart illustrating a method 300 of managing a communication group using the system 280. As illustrated in FIG. 4, the method 300 includes forming a communication group including one or more portable communications devices based on a first object of interest (at block 310). For example, the call controller 100 may receive a request from a portable communications device or another device (e.g., the computer console) to initiate a communication group regarding a particular incident, such as a pursuit of a suspect vehicle.

The first object of interest associated with the communication group may be specified with the request for the communication group. For example, the request for a communication group may include an image containing the first object of interest or a description of the first object of interest (e.g., a red 4-door vehicle). It should be understood that the first object of interest may also be specified or updated after the initiation of the communication group.

In some embodiments, the first object of interest may be manually selected, such as by a user selecting a portion of an image included in an image feed through a touch screen or other input mechanism associated with the call controller 100, a subscriber unit 200, a portable communications device, or another device communicating with the call controller 100. For example, continuing with the vehicle pursuant example, the suspect vehicle may be selected by a user as the first object of interest.

Alternatively or in addition, the first object of interest may be automatically selected by the call controller 100, a subscriber unit 200, a portable communications device, or another device communicating with the call controller 100. For example, the first object of interest may be automatically selected based on identifying a common object included in one or more image feeds, based on communications received from one or more portable communications devices such as an all-points bulletin, based on upon a mission assigned to a portable communications device, and the like.

After the first object of interest is identified, a second object of interest is identified based on the first object of interest (at block 320). In some embodiments, the second object of interest is included in an image or image feed including the first object of interest (e.g., based on context of the first object of interest or including one or more objects positioned around the first object of interest in the image feed). For example, again continuing with the vehicle pursuit example, the second object of interest may be a street or traffic sign, a building, or another landmark included in an image feed that includes the first object of interest (e.g., positioned in a direction the suspect vehicle is heading, adjacent to or within a predetermined distance from the suspect vehicle, and the like).

Similarly, in some embodiments, the second object of interest is identified within an image feed associated with a portable communications device included in the communication group (e.g., regardless of whether the image feed also includes the first object of interest). For example, continuing with the vehicle pursuit example, when a portable communications device included in the communication group is in pursuit of the suspect vehicle and an associated image feed captures an image of a street sign, the street sign may be used as the second object of interest. Accordingly, image feeds associated with portable communications devices included in the communication group may be used to identify the second object of interest.

Alternatively or in addition, the second object of interest may be inferred from the first object of interest or image feeds associated with portable communications devices included in the communication group. For example, when the location of a subscriber unit 200 is known, landmarks located around the location of the subscriber unit 200 may be inferred (e.g., virtually or based on historical data) as compared to being identified in an image feed provided by the subscriber unit 200. Similarly, when an image feed includes only partial view of other landmarks (e.g., partial street signs), the full street sign may be inferred as the second object of interest. The full street sign may be generated virtually or pulled from historical data (e.g., a database storing historical image feeds or a set of images of landmarks or other common second objects of interest).

In some embodiments, a type of the first object of interest (or the associated incident) impacts the second object of interest. For example, as noted above, during a vehicle pursuit, the second object of interest may include landmarks. However, during a fire incident, the second object of interest may include smoke generated by the fire or adjacent buildings or persons of interest leaving the scene of the fire.

Again, as noted above for the first object of interest, the second object of interest may be manually selected or automatically selected. In addition, it should be understood that, in some embodiments, a plurality of second objects of interest may be identified.

After identifying the second object of interest, the method 300 includes determining whether a first image feed associated with the first subscriber unit 200a includes the second object of interest (at block 330). The image feed may be processed using known image analysis techniques for recognizing a particular object (or a portion thereof), such as by automatically identifying objects having a matching pattern, shape, size, color, or configuration as the second object of interest even when the object is at different angles or positions.

It should be understood that, in some embodiments, a predetermined subset of the first image feed is analyzed to determine whether the first image feed includes the second object of interest. For example, a predetermined time period (e.g., the last one, five, or ten minutes) of the first image feed may be analyzed to identify whether a current location of the first subscriber unit 200a is within a predetermined distance (e.g., measured in terms of distance or time) of the second object of interest. As one example, when a suspect vehicle crosses Main Street, the first portable communications device 290a may be added to the communication group for the vehicle pursuit when the first subscriber unit 200a captured a street sign for Main Street within the past minute. Accordingly, a time constraint may be imposed for determining when an image feed includes a desired object of interest. Similarly, in some embodiments, a predetermined area or direction of the second image feed (e.g., an upper area, a north direction, and the like) may be analyzed to determine whether the second image feed includes the second object of interest. For example, when the second object of interest includes smoke from a fire incident, only an upper area of the second image feed (i.e., representing the sky) may be processed.

Also, it should be understood that the first image feed may include a live image feed, a virtual image feed, or a combination thereof. A virtual image feed is a predicted image feed generated for a subscriber unit 200 based on current parameters of the subscriber unit 200, such as the subscriber's unit current location (e.g., determined based on a received global positioning system (GPS) signal or other positioning signals). For example, in some embodiments, a subscriber unit 200 may not include or communicate with a camera or the camera associated with a subscriber unit 200 may not be functioning (e.g., may be malfunctioning or may be turned off). In some embodiments, the virtual image feed may be generated by determining a virtual field-of-view of a subscriber unit 200 or a camera associated with the subscriber unit 200 (e.g., the external camera 250). A facing direction of the subscriber unit 200 or an associated camera may be determined (e.g., using a compass in the subscriber unit 200) and/or a pre-determined focal length may be applied in the facing direction of the subscriber unit 200 to determine the virtual field-of-view. A database (e.g., a map) along with other parameters may also be used to identify the virtual field-of-view for the virtual image feed. The virtual image feed may then be used, as described above, to identify objects of interest. It should be understood that a virtual image feed may be generated by a subscriber unit 200, the call controller 100, a separate device, or a combination thereof.

When the first image feed includes the second object of interest, the first portable communications device 290a associated with the first image feed (i.e., the first subscriber unit 200a) is added to a communication group (e.g., a talkgroup) (at block 340).

Returning to FIG. 4, the method 300 repeats (e.g., continuously) to dynamically update the members of the communication group. For example, continuing with the vehicle pursuit example, the second subscriber unit 200b may include a dashboard camera installed in a second police vehicle transporting a police officer carrying the second portable communications device 290b. When the second object of interest is a street sign and the second image feed includes the street sign, the second portable communications device 290b associated with the second subscriber unit 200b is also added to the communication group. Assigning the second portable communications device 290b to the communication group assigns the police officer carrying the second portable communications device 290b to the vehicle pursuit because the police officer is in the proximity of the suspect vehicle based on the second image feed provided by the second subscriber unit 200b. Accordingly, even when the second image feed does not include the first object of interest (i.e., the suspect vehicle) but includes the second object of interest, the second portable communications device 290b may be assigned to an incident (e.g., pursuit of a suspect vehicle) because the second image feed indicates that the second subscriber unit 200b is located close to the current scene of the incident. Accordingly, object-orientated communication groups may be formed and dynamically updated based on objects of interest detected in image feeds.

Also, in some embodiments, when an image feed associated with a portable communications device already included in the communication group no longer includes the second object of interest (at bock 350), the portable communications device is removed from the communication group. In this respect, based on the second object of interest, portable communication devices may be dynamically added and removed from the communication group.

Similarly, the second object of interest may be updated (i.e., replaced), which further dynamically changes the members of the communication group. For example, in some embodiments, the second object of interest may be identified from image feeds associated with portable communication devices included in the communication group and, in particular, may include an object captured in a predetermined number or a predetermined percentage of the associated image feeds. Accordingly, the second object of interest may be changed as the image feeds change, which subsequently changes the portable communications devices included in the communication group.

Also, in some embodiments, a list of objects is generated that includes the first object of interest, one or more second objects of interest, or both. Accordingly, as an alternative to or in addition to replacing a second object of interest, a new second object of interest may be added to the list of objects. Thus, a portable communications device may be added to the communication group when an image feed associated with the portable communications device includes at least one object included in the list of objects, a predetermined subset (e.g., two or more) of the list of objects, or all of the objects included in the list of objects. For example, the second portable communications device 290b may be added to the communication group when at least one object included in the list of objects is included in the second image feed. Accordingly, as the list of objects changes, members of the communication group may also dynamically change.

Figure 5:
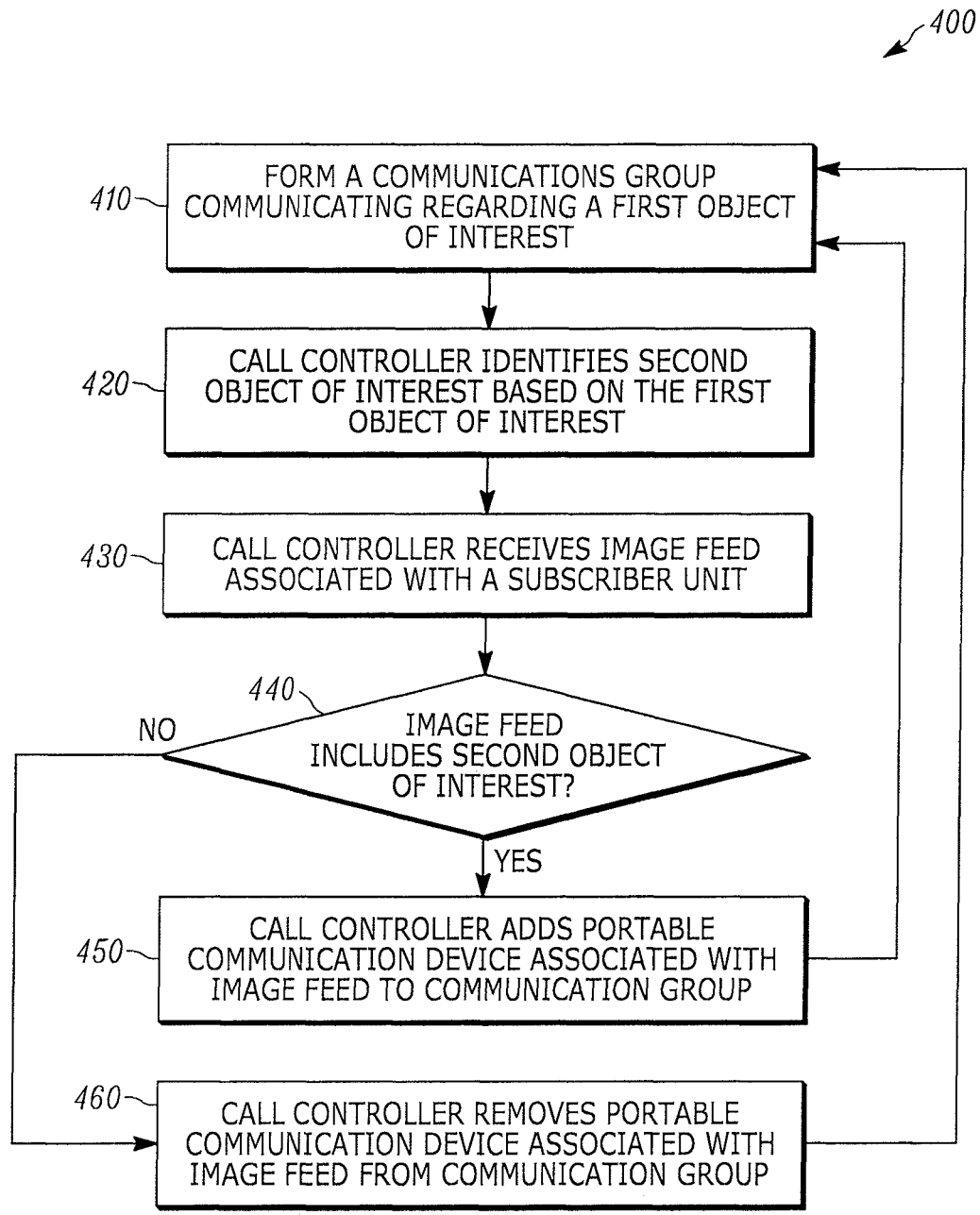

It should be understood that the method 300 may be performed by the call controller 100, the first subscriber unit 200a, the second subscriber unit 200b, or a combination thereof. For example, FIG. 5 illustrates a method 400 for implementing the method 300. As described below, in the method 400, the call controller 100 identifies the second object of interest, identifies whether the first image feed includes the second object of interest, and adds the first portable communications device 290a to the communication group accordingly.

In particular, as illustrated in FIG. 5, the method 400 includes the call controller 100 forming the communication including the one or more portable communications devices communicating regarding the first object of interest as described above for method 300 (at block 410). The call controller 100 also identifies a second object of interest based on the first object of interest as also described above with respect to method 300 (at block 420). Furthermore, the call controller 100 receives the first image feed associated with the first subscriber unit 200*a* (e.g., over the communication network 160) (at block 430) and determines whether the first image feed includes the second object of interest as described above with respect to method 300 (at block 440). For example, in some embodiments, the call controller 100 may include an image processing module as part of the electronic processor 110 or as a separate processor. The image processing module may implement known image processing techniques to recognize the second object of interest in the first image feed.

When the first image feed includes the second object of interest, the call controller 100 adds the first portable communications device 290*a* to the communication group (at block 450). In some embodiments, the call controller 100 uses metadata provided with the first image feed to identify the first portable communications device 290*a* associated with the first subscriber unit 200*a*. Alternatively or in addition, the call controller 100 may access stored data to identify the first portable communications device 290*a* associated with the first subscriber unit 200*a* (e.g., using a look-up table that maps subscriber unit identifiers to portable communications device identifiers).

As noted above, the call controller 100 may add the first portable communications device 290*a* to the communication group by sending the first portable communications device 290*a* a talkgroup identifier associated with the communication group. It should be understood that, in some embodiments, the call controller 100 sends a talkgroup identifier associated with the communication group to the subscriber unit 200, which forwards the talkgroup identifier to an associated portable communications device.

As illustrated in FIG. 5, the method 400 repeats (e.g., continuously) to dynamically determine members for the communication group. As also described above, with respect to FIG. 3, in some embodiments, the call controller 100 also determines when a portable communications device previously added to a communication group should be removed (at block 460). In some embodiments, the call controller 100 also processes image feeds to dynamically determine when an incident has been handled and the communication group should be adjusted accordingly (e.g., the communication group should be dissolved, no new portable communication devices should be added to the communication group, and the like). Similarly, as also described above with respect to the method 300, the call controller 100 may process one or more image feeds to determine whether the first object of interest, a second object of interest, or both should be updated, which may dynamically impact what portable communication devices are added to the communication group.

Also, as noted above, in some embodiments, the call controller 100 generates a list of objects of interest that may include the first object of interest, at least one second object of interest, or both. Accordingly, in some embodiments, the call controller 100 transmits determines whether the first image feed includes at least one object included in the list of objects of interest.

Figure 6:
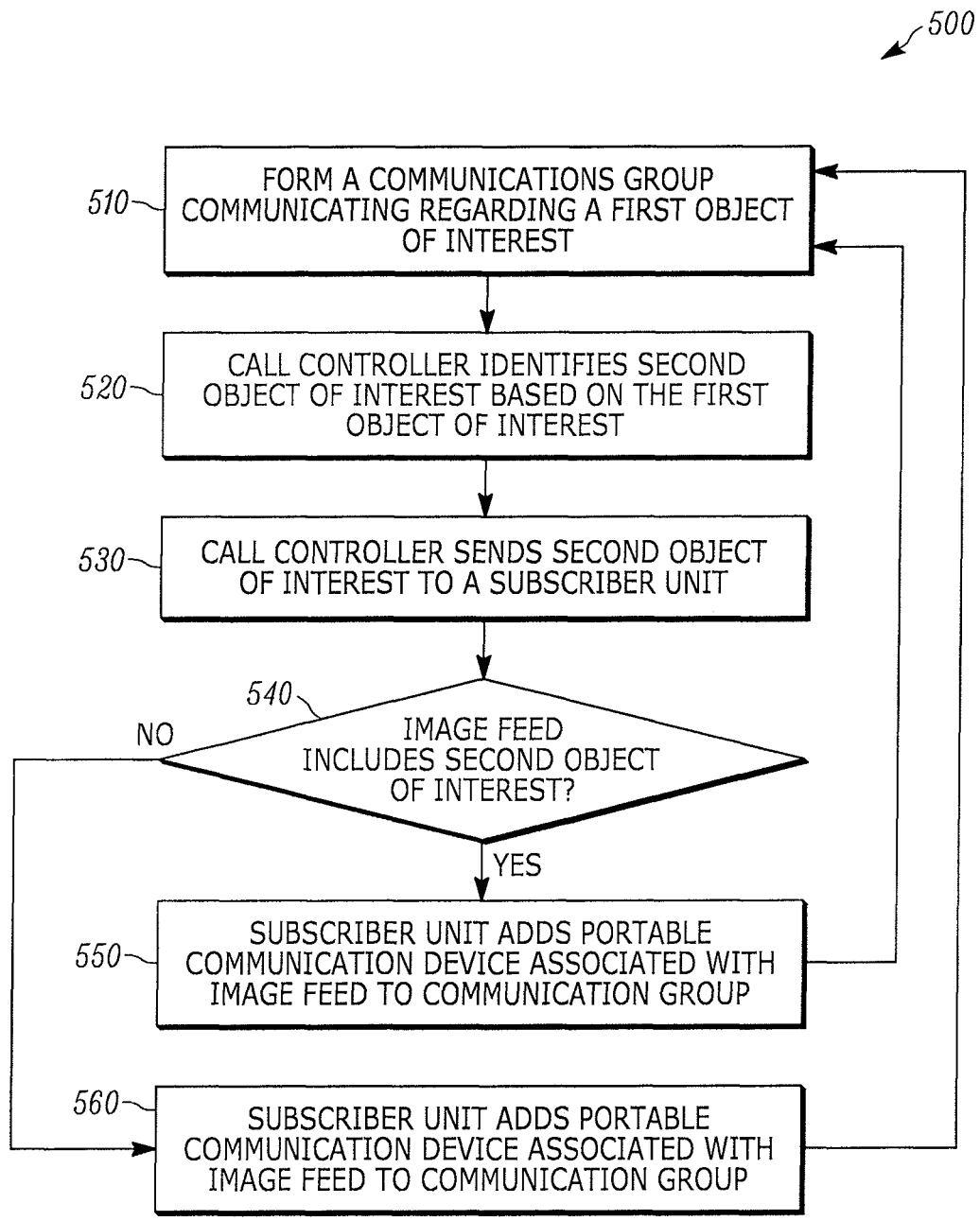

Alternatively, FIG. 6 illustrates another method 500 for implementing the method 300. As described below, in the method 500, the call controller 100 identifies the second object of interest and provides the second object of interest to the first subscriber unit 200*a*, and the first subscriber unit 200*a* identifies whether the first image feed includes the second object of interest and joins the communication group accordingly.

In particular, as illustrated in FIG. 6, the method 500 includes the call controller 100 forming the communication group including the one or more portable communications devices communicating regarding the first object of interest as described above with respect to the method 300 (at block 510). The call controller 100 then identifies a second object of interest based on the first object of interest as also described above with respect to the method 300 (at block 520). After identifying the second object of interest, the call controller 100 sends the second object of interest to the first subscriber unit 200*a* (e.g., over the communication network 160) (at block 530).

The first subscriber unit 200*a* determines whether the first image feed includes the second object of interest (at block 540). For example, in some embodiments, the first subscriber unit 200*a* may include an image processing module as part of the unit electronic processor 210 or as a separate processor. The image processing module may implement known image processing techniques to recognize the second object of interest in the first image feed.

When the first image feed includes the second object of interest, the first subscriber unit 200*a* adds the first portable communications device 290*a* to the communication group (at block 550). For example, to be added to the communication group, the first subscriber unit 200*a* may provide an acknowledgment to the call controller 100 indicating that the first image feed includes the second object of interest, which may serve as a request for the call controller 100 to add the first portable communications device 290*a* to the communication group. In some embodiments, the acknowledgment includes an identifier of the first portable communications device 290*a*. In other embodiments, the call controller 100 may determine an identifier of the first portable communications device 290*a* based on the first subscriber unit 200*a* (e.g., based on an identifier of the first subscriber unit 200*a*). The call controller 100 uses the identifier of the first portable communications device 290*a* to provide the first portable communications device 290*a* with the talkgroup identifier associated with the communication group. In particular, in response to the acknowledgement, the call controller 100 may transmit a talkgroup identifier associated with the communication group to the first portable communications device 290*a* (e.g., directly or through the first subscriber unit 200*a*). Alternatively or in addition, the first subscriber unit 200*a* may instruct the first portable communications device 290*a* to join the communication group, and the first portable communications device 290*a* may issue a request to the call controller 100 to join the communication group.

It should be understood that, in some embodiments, the first portable communications device 290*a* determines whether the first image feed includes the second object of interest (as an alternative to or in addition to the first subscriber unit 200*a*). For example, the first portable communications device 290*a* may receive the first image feed from the first subscriber unit 200*a*, receive the second object of interest from the call controller 100 (e.g., directly or through the first subscriber unit 200*a*), and determine whether the first image feed includes the second object of interest.

Also, as noted above, in some embodiments, the call controller 100 generates a list of objects of interest that may include the first object of interest, at least one second object of interest, or both. Accordingly, in some embodiments, the call controller 100 transmits the list of objects of interest to the first subscriber unit 200a and the first subscriber unit 200a may determine whether the first image feed includes at least one object included in the list of objects of interest.

As illustrated in FIG. 6, the first subscriber unit 200a may repeatedly (e.g., continuously) process the first image feed to determine whether the first portable communications device 290a should be removed from the communication group (at block 560). For example, when the first subscriber unit 200a determines that the first image feed no longer includes the second object of interest, the first subscriber unit 200a may instruct the call controller 100, the first portable communications device 290a, or both that the first portable communications device 290a should no longer be included in the communication group. Also, in some embodiments, the first subscriber unit 200a may receive an updated second object of interest, which the first subscriber unit 200a uses to determine whether the first portable communications device 290a should remain in or be removed from the communication group.

It should be understood that the methods 400 and 500 of FIGS. 5 and 6 may be combined in various manners. For example, in some embodiments, the call controller 100 may initially determine whether to add a portable communications device to a communication group and, thereafter, the associated subscriber unit 200 may determine whether the portable communications device should remain part of or be removed from the communication group (e.g., by processing an image feed). Also, in some embodiments, a subscriber unit 200 may receive a second object of interest from another subscriber unit 200 (e.g., directly or through the call controller 100) rather than from the call controller 100.

It should also be understood that devices or systems other than a subscriber unit 200 (or an associated portable communications device) or the call controller 100 may identify an object of interest in an image feed. For example, in some embodiments, an image feed may be transmitted (e.g., over a wired or wireless connection) to an image processing device that processes the image feed to identify an object of interest in the image feed (or the lack of an object of interest in an image feed).

Accordingly, the methods, systems, and apparatuses described herein dynamically form object-orientated communication groups based on objects identified in live or virtual feeds. As described above, a second object of interest based on a first object of interest is identified and used to add (and remove) members of a communication group. The second objects of interest may represent an object associated with the first object of interest, such as landmarks or other recognizable objects located around the first object of interest. Therefore, the second objects of interest allow an image feed and an associated portable communications device to be associated with an incident more accurately and even when the image feed does not include the first object of interest. Thus, the methods, systems, and apparatuses described herein form and manage communication groups accurately and efficiently.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of managing a communication group, comprising:
    receiving a request to initiate a communication group, the request including an image;
    identifying a first object of interest from the image;
    forming a communication group of one or more portable communications devices based on the first object of interest;
    automatically identifying, using an electronic processor of a call controller, a second object of interest based on the first object of interest and a first image feed received from a first subscriber unit included in the communication group, the second object of interest and the first object of interest included in the first image feed;
    determining whether a second image feed received from a second subscriber unit includes the second object of interest; and
    adding, with the electronic processor, a portable communications device associated with the second subscriber unit to the communication group of one or more portable communications devices based on determining that the second image feed received from the second subscriber unit includes the second object of interest.

2. The method of claim 1, further comprising creating a list of objects of interest, the list of objects of interest including the first object of interest and the second object of interest and wherein determining whether the second image feed includes the second object of interest includes determining whether the second image feed includes at least one object included in the list of objects of interest.

3. The method of claim 2, further comprising removing at least one of the one or more portable communications devices included in the communication group based on determining that a third image feed associated with at least one of the one or more portable communications devices does not include at least one object from the list of objects of interest.

4. The method of claim 1, wherein determining whether the second image feed includes the second object of interest includes determining whether a virtual image feed includes the second object of interest.

5. The method of claim 1, wherein adding the portable communications device to the communication group includes sending an identifier associated with the communication group to the portable communications device.

6. The method of claim 1, wherein determining whether the second image feed includes the second object of interest includes:
    sending the second object of interest to the second subscriber unit providing the second image feed, and
    receiving acknowledgement, from the second subscriber unit, when the second image feed includes the second object of interest.

7. The method of claim 1, wherein identifying the second object of interest includes identifying a landmark positioned around the first object of interest based on a location of at least one of the one or more portable communications device included in the communication group.

8. The method of claim 1, wherein the first object of interest is automatically selected for forming the communication group based on identifying a common object included in a plurality of image feeds.

9. The method of claim 1, wherein a predetermined subset of the second image feed is analyzed to determine whether the second image feed includes the second object of interest.

10. The method of claim 9, wherein the predetermined subset of the second image feed is a predetermined time period of the second image feed.

11. The method of claim 1, wherein a predetermined subset of the second image feed is analyzed to determine whether the second image feed includes the second object of interest.

12. The method of claim 11, wherein the predetermined subset of the second image feed is a predetermined time period of the second image feed.

13. A call controller comprising:
    an electronic processor coupled to a transceiver; and
    a memory coupled to the electronic processor and containing instructions that, when executed by the electronic processor, perform a set of functions including:
        receiving a request to initiate a communication group, the request including an image;
        identifying a first object of interest from the image;
        forming a communication group of one or more portable communications devices based on the first object of interest;
        automatically identifying a second object of interest based on the first object of interest and a first image feed received from a first subscriber unit included in the communication group, the second object of interest and the first object of interest included in the first image feed;
        determining whether a second image feed received from a second subscriber unit includes the second object of interest; and
        adding a portable communications device associated with the second subscriber unit to the communication group of one or more portable communications devices based on determining that the second image feed received from the second subscriber unit includes the second object of interest.

14. The call controller of claim 13, wherein the set of functions further comprises creating a list of objects of interest, the list of objects of interest including the first object of interest and the second object of interest and wherein determining whether the second image feed includes the second object of interest includes determining whether the second image feed includes at least one object included in the list of objects of interest.

15. The call controller of claim 14, wherein the set of functions further comprises removing at least one of the one or more portable communications devices included in the communication group based on determining that third image feed associated with at least one of the one or more portable communications devices does not include at least one object from the list of objects of interest.

16. The call controller of claim 13, wherein determining whether the second image feed includes the second object of interest includes determining whether a virtual image feed includes the second object of interest.

17. The call controller of claim 13, wherein adding the portable communications device to the communication group includes sending an identifier associated with the communication group to the portable communications device.

18. The call controller of claim 13, wherein determining whether the second image feed includes the second object of interest includes:
   sending the second object of interest to the second subscriber unit providing the second image feed, and
   receiving acknowledgement, from the second subscriber unit, when the second image feed includes the second object of interest.

19. The call controller of claim 13, wherein identifying the second object of interest includes identifying a landmark positioned around the first object of interest based on a location of at least one of the one or more portable communications device included in the communication group.

20. The call controller of claim 13, wherein the first object of interest is automatically selected for forming the communication group based on identifying a common object included in a plurality of image feeds.

\* \* \* \* \*